United States Patent [19]
Dittrich et al.

[11] 3,821,003
[45] June 28, 1974

[54] BINDERS FOR FINISHING AND COATING COMPOSITIONS

[75] Inventors: Werner Dittrich, Herten/Baden; Arnold Lenz, Kohn-Stammheim, both of Germany

[73] Assignee: Dynamit Nobel Aktiengesellschaft, Troisdorf, Germany

[22] Filed: Mar. 31, 1971

[21] Appl. No.: 129,987

[30] Foreign Application Priority Data
Apr. 18, 1970 Germany............................ 2018622

[52] U.S. Cl................. 106/1, 106/14, 106/287 SB, 106/287 SE, 260/31.2 R, 260/33.4 SB, 260/37 SB
[51] Int. Cl......... C07f 7/18, C09d 5/08, C09k 3/00
[58] Field of Search ............ 106/287 SB, 287 SE, 1, 106/14; 260/33.4 SB, 37 SB, 31.2 R

[56] References Cited
UNITED STATES PATENTS

| | | | |
|---|---|---|---|
| 2,660,538 | 11/1953 | Emblem et al................. | 106/287 SB |
| 3,350,345 | 10/1967 | Vanderbilt et al............. | 260/41.5 A |
| 3,392,036 | 7/1968 | McLeod........................ | 106/287 SB |
| 3,428,706 | 2/1969 | Jasinski et al................ | 260/33.4 SB |
| 3,505,086 | 4/1970 | Freyhold...................... | 106/14 |
| 3,565,851 | 2/1971 | Neuroth....................... | 260/37 SB |

OTHER PUBLICATIONS
Freeman, Silicones, Published for the Plastics Institute–Iliffe Books Ltd., London, 1962 pages 4–6.

*Primary Examiner*—Allan Lieberman
*Attorney, Agent, or Firm*—Burgess, Dinklage & Sprung

[57] ABSTRACT

Finishing and/or coating compositions, particularly for use with metallic pigments and for covering metallic surfaces, which use as the binder for the pigment partially hydrolyzed alkoxy silanes of the general formula:

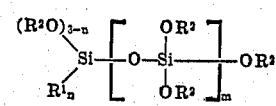

wherein $R^1$ is alkyl, aryl, alkenyl or aralkyl; $R^2$ are alkyl groups of one to 10 carbon atoms; m is 0 to 10; and n is 1, 2 or 3. The coatings of this invention give superior cathodic protection, have improved thermal stability and have improved crack resistance as compared to otherwise similarly pigmented coatings which utilize different binders.

11 Claims, No Drawings

BINDERS FOR FINISHING AND COATING COMPOSITIONS

This invention relates to novel coating and/or finishing compositions. It more particularly refers to novel binders for such coating and finishing compositions.

Finishing and coating compositions are widely used to protect various metal or other surfaces from attack, particularly corrosion. It is known to prepare such coating and/or finishing compositions by admixing a suitable pigment, binding agent and fugitive solvent or diluent. Known binding agents include chlorinated rubbers, alkyd resins, epoxy resins, organic silicates and inorganic silicates. While each of the known binding agents does its job in that it binds the pigment particles together in a film on the surface being covered, each also has defects which make films which use such somewhat less than perfect. For example, the organic binders, particularly the chlorinated rubber, alkyd and epoxy resins, are excellent insulators whereby effectively preventing or retarding any possible cathodic protection which metallic or mineral pigment particles might afford a metal surface being coated. The inorganic type of binders, for example the silicates, do not retard or appreciably diminish any cathodic protection which the metallic or mineral pigment particles might afford. However, it has been found that such films have relatively low flowability and elasticity and they, therefore are subject to cracking and splitting wherefor providing an ineffective surface protection.

A further disadvantage of the known binders, particularly the organic binders, is that pigmented films and coatings made therefrom have relatively low thermal stability. For example, coating compositions of the known zinc dust pigmented type are thermally stable only up to about 150°C, which is less than desired.

It is, therefore, an object of this invention to provide improved metallic or mineral pigmented surface coatings.

It is another object of this invention to provide novel finishes for metallic surfaces.

It is a further object of this invention to provide novel binders for metallic and mineral pigmented surface coating and finishing compositions.

Other and additional objects of this invention will become apparent from a consideration of this entire specification including the claims hereof.

In accord with and fulfilling these objects, one aspect of this invention resides in a novel binder for metallic and/or mineral pigments consisting essentially of partially hydrolyzed alkoxy silanes of the general formula:

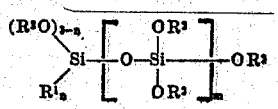

wherein $R^1$ is alkyl, aryl, alkenyl or aralkyl; $R^2$ is alkyl of 1 to 10 carbon atoms; m is 0 to 10 and n is 1, 2 or 3. Where more than one $R^1$ is present in the molecule, different R's may be the same or different. Where more than one $R^2$ is present in the molecule, different $R^2$ s may be the same or different.

According to this invention the $R^1$ alkyl group is branched or straight chain and preferably one to four carbon atoms in content. The alkenyl group may have up to about 8 carbon atoms therein with one or more cites of olefinic unsaturation. The preferred alkenyl is vinyl. The aryl group is preferably monocyclic and may be alkyl substituted in up to five positions. Where the aryl group is alkyl substituted, the alkyl group substituents thereon may be the same or different and may have up to about six carbon atoms therein in straight or branched chain configuration. Aralkyl groups are illustrated by benzyl groups which may or may not be alkyl substituted as aforesaid with respect to the aryl group.

As alkoxy group, preferably the ethoxy group is used. Higher alkoxy groups up to four carbon atoms can then be used when in the alkoxylation of the chlorosilanes they are used in mixture so that the siloxane forming as binder is mixed alkoxy-substituted or consists of a mixture of different alkyl (or aryl or aralkyl) alkoxysilanes with differing alkoxy groups.

Generally, it can be said that as the chain length of the alkoxy group of the polysiloxane increases, the storage life of the partial hydrolysates thereof increases, provided that at the same time short-chained alkoxy groups are also present in the molecule. A detriment which accompanies this benefit however, is that the coating and finishing compositions prepared therefrom take longer to dry. This extended drying time is not a detriment in tropical climate zones or in hot weather where it is advantageous to have this retarded drying.

The alkoxy group can preferably contain four to ten carbon atoms, if it contains an ether-oxygen bridge and provided that in the same molecule or in the silane mixture there are still so many alkoxy radicals with two to three carbon atoms that at least 60 percent of the totally present alkoxy groups of the partially hydrolyzed silane or silane mixture consist of $C_2 - C_3 -$ alkoxy groups, and the remaining part of the alkoxy groups consists of oxyalkyl ether radicals. Typical compounds of this type are those of the average summation formula $C_2H_5-Si\ (OC_2H_5)_2\ (OCH_2CH_2OCH_2CH_3)$ or $CH_3\ [Si\ (OC_2H_5)_2 - O]_4 - Si\ (OC_2H_5)\ [OCH_2-CH_2-O-(CH_2)_2CH_3]_2$.

The term "Average summation formula" means in this case that the alkoxy groups in the molecule are not tied to a fixed place and are exchangeable within the molecule.

According to this invention the binding agent may be a pure compound. It is preferred, however, that it be a partial hydrolyzate of a mixture of individual compounds or a mixed partial hydrolyzate of a given compound or both. The hydrolyzate of one or more compounds of the above general formula can be prepared by conventional processing techniques.

An alkyl (or aryl or aralkyl) halogen silane is allowed to react in the known manner with a given amount of an alcohol $R^2OH$, $R^2$ having the above-named constitution, necessary for the conversion of the silane being reacted to a corresponding alkyl (or aryl or aralkyl) alkoxy silanes with the desired number of alkyl (or aryl or aralkyl) groups. The thus produced alkoxy silane is reacted with water in a suitable thinner (e.g., lower alcohols or ketones) in a known manner to form polysiloxanes with up to 10 silicon atoms in the chain. Following this procedure, the alcohol split off by this condensation to the polysiloxane chain is distilled off.

The polysiloxane thus formed is then, possibly in the presence of ethyl acetate and/or ethylene (or hexylene) glycol monoalkyl ether and/or isopropanol, mixed with a given amount of water which, upon the addition of a known hydrolization catalyst, preferably hydrochloric acid, hydrolyzes part of the alkoxy groups (10–60 percent, preferably 25–45 percent) of the polysiloxane. It is preferred that the reaction temperature of the hydrolysis not exceed about 25°C. This partial hydrolysis can also be carried out with a silane of the general formula $R^1$—Si—$(OR^2)_3$ or $(R^1)_2$—Si—$(OR^2)_2$ ($R^1$ and $R^2$ having the abovementioned definitions), without these silanes having been first condensed to a siloxane. It is within the scope of this invention to use as reactants for the partial hydrolyzation reaction a mixture of different silanes whereupon mixed substituted, partially hydrolyzed siloxanes are obtained.

Finishing and coating compounds prepared with the binders of this invention give flawless films which, when using, e.g., zinc dust as pigmenting agent, in consequence of the metallic contact of the zinc dust particles with each other and with a metallic surface to be protected, protect the latter also cathodically. The thermal load of such coatings is considerably higher than that of known resin-bound zinc dust paints; they are stable up to 400°C.

The new binder is, in contrast to known binders, soluble in almost all conventional organic solvents such as alcohols, ketones, ethers, aromatics, cycloaliphatics and heterocyclics.

The coating applied from the finishing compositions of this invention are, on the other hand, after application and setting substantially resistant to these known solvents.

A further advantage of the binders according to the invention is their long storage life at room temperature, even when already mixed with a pigment. Coating and finishing compositions prepared therewith have an opt. time of at least 8 hours and, applied as coat, adhere firmly to the metallic surface to be protected.

The following examples will serve to illustrate this invention without being limiting thereon:

EXAMPLE 1

600 parts by weight of ethyl triethoxysilane were allowed to react with a mixture of 100 parts by weight of hexylene glycol monobutyl ether, 10 parts by weight of ethyl acetate, 100 parts by weight of hexylene glycol monoethyl ether and 100 parts by weight of isopropanol, and with 90 parts by weight of water containing 0.5 percent by weight of HCl. Through proper cooling, the reaction temperature was not allowed to rise above 25°C.

A partially hydrolyzed product with 19.2 percent equivalent $SiO_2$ was obtained. The storing property at elevated temperature was tested; it was stored at 70°C more than 45 days, i.e., the partially hydrolyzed product could also after this time be used without difficulty as binder in a zinc dust paint.

To that end, one part by weight of the binder was mixed with 4.5 parts by weight of zinc dust under constant stirring. The zinc dust used consisted of 94 percent by weight of finely divided zinc dust of a size of grain of 0 – 30 microns, the average size of grain being 6 microns, and 2 percent by weight each of finely divided chrome oxide, microcrystalline talcum and microcrystalline mica. Applied in a thickness layer of 75 microns, the paint had hardened after 15 hours to such an extent that an "ERICHSEN" hardness testing bar with a 200 g load failed to make any appreciable indentation therein.

The coating was, after setting, completely free of cracks and firmly adhered to the base.

EXAMPLE 2

A mixture of 1 mol methyl trichlorosilane and 4 mols silicon tetrachloride was first reacted with 2 mols hexylene glycol monoethyl ether and then completely esterified with 17 mols ethyl alcohol. After the resulting hydrogenchloride had in large part been drawn off, 4 mols water in 200 ml ethanol were added to the reaction mixture. Following that, the mixture was heated and the added alcohol was distilled off together with the hydrolytically split off alcohol. The product then condensed with formation of a siloxane with the empirical formula:

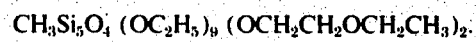

540 parts by weight of this siloxane were admixed with 282 parts by weight of hexylene glycol monoethyl ether, 116 parts by weight of isopropanol, two parts by weight of ethyl acetate and 60 parts by weight of 1 percent - hydrochloric acid. The reaction temperature was held at 25°C. A partially hydrolyzed product with a 20.2 percent equivalent $SiO_2$ content and a storage ability at room temperature of 18 months was obtained. One part by weight of this partially hydrolyzed product with 4.5 parts by weight of zinc dust pigment, as described under 1), gives a coating and finishing compound which in layers of 75 microns sets without cracks and firmly adheres to the base.

EXAMPLE 3

In accordance with Example 2, in place of methyl trichlorosilane 1 mol phenyl trichlorosilane was reacted and condensed. After the partial hydrolysis a binder for coating and finishing compounds was obtained which was substantially equivalent to the binders described in Example 2.

EXAMPLE 4

Starting from vinyl trichlorosilane, one obtains analogously to Example 2 after esterification, condensation and partial hydrolysis a binder which has properties analogous to those of Example 2.

What is claimed is:

1. A coating or finishing composition comprising a fugitive liquid vehicle, a pigment and a binder consisting essentially of a partially hydrolyzed organosilicon compound whose unhydrolyzed form has the general formula:

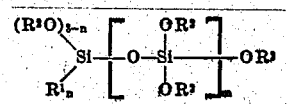

wherein $R^1$ are identical or different aryl, alkenyl, alkyl or aralkyl groups, and $R^2$ are identical or different alkyl groups with one to 10 carbon atoms, m is 0 to 10 and n is 1 wherein from 10 to 60 percent of the alkoxy groups of said organosilicon compound are hydrolyzed.

2. A composition as claimed in claim 1 wherein said binder $R^2$ is identical or different alkyl radicals with two to four carbon atoms.

3. A composition as claimed in claim 1 wherein in said binder $R^2$ consists of 60 to 95% of alkyl radicals with two to three carbon atoms and to 5 to 40 percent of alkyl ether radicals with four to 10 carbon atoms.

4. A composition as claimed in claim 1 wherein in said binder an alkyl radical directly bound to the silicon atom is an alkyl group with one to eight carbon atoms.

5. A composition as claimed in claim 1 wherein in said binder an alkyl radical directly bound to the silicon atom is an alkyl group with one to four carbon atoms.

6. The composition, according to claim 1, wherein $R^1$ is an unsubstituted alkyl radical of two to four carbon atoms, said composition hydrolyzed with respect to its alkoxy groups in an amount of 10 and 60 percent of the alkoxy groups present in the silane.

7. A composition according to claim 6, wherein $R^2$ consists of 60 to 95 percent of alkyl radicals with two or three carbon atoms and 5 to 40 percent of alkyl ether radicals with four to 10 carbon atoms.

8. A composition according to claim 6 wherein said binder is an alkyl binder directly bound to the silicon atom of the alkyl group with one to eight carbon atoms.

9. A coating composition comprising a fugitive liquid vehicle selected from the group consisting of alcohols and lower esters, and metallic or mineral pigment and a binder consisting essentially of a partially hydrolyzed organosilicon compound whose unhydrolyzed form has the general formula:

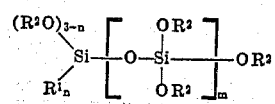

wherein $R^1$ are identical or different aryl alkenyl, alkyl, or aralkyl groups and $R^2$ are identical or different alkyl groups with one to 10 carbon atoms, m is 0 to 10 and n is 1 wherein from 10 to 60 percent of the alkoxy groups of said organosilicon compound are hydrolyzed.

10. A coating composition according to claim 9 wherein $R^1$ is unsubstituted.

11. A coating or finishing composition according to claim 1 wherein from 25 to 45 percent of the alkoxy groups of said organosilicon compound are hydrolyzed.

* * * * *